US010293875B2

(12) United States Patent
Roberson et al.

(10) Patent No.: US 10,293,875 B2
(45) Date of Patent: May 21, 2019

(54) AXEL LIFT MECHANISM

(71) Applicant: Consolidated Metco, Inc., Vancouver, WA (US)

(72) Inventors: Timothy James Roberson, Vancouver, WA (US); Ryan Dillon, Portland, OR (US); William Pileggi, Beaverton, OR (US)

(73) Assignee: CONSOLIDATED METCO, INC., Vancouver, WA (US)

( * ) Notice: Subject to any disclaimer, the term of this patent is extended or adjusted under 35 U.S.C. 154(b) by 68 days.

(21) Appl. No.: 15/415,388

(22) Filed: Jan. 25, 2017

(65) Prior Publication Data

US 2018/0208260 A1 Jul. 26, 2018

(51) Int. Cl.
*B62D 61/12* (2006.01)

(52) U.S. Cl.
CPC ........... *B62D 61/125* (2013.01); *B62D 61/12* (2013.01); *B60G 2200/31* (2013.01); *B60G 2200/341* (2013.01); *B60G 2202/152* (2013.01); *B60G 2204/4702* (2013.01); *B60G 2300/0262* (2013.01); *B60G 2300/04* (2013.01)

(58) Field of Classification Search
CPC ........ B62D 61/125; B62D 61/12; B60G 5/04; B60G 9/003; B60G 9/00; B60G 2204/4702; B60G 2204/47
See application file for complete search history.

(56) References Cited

U.S. PATENT DOCUMENTS

| | | | | | |
|---|---|---|---|---|---|
| 2,865,649 | A * | 12/1958 | Chalmers | B60G 5/04 | 105/198.1 |
| 2,865,650 | A * | 12/1958 | Chalmers | B60G 5/04 | 267/35 |
| 3,140,880 | A * | 7/1964 | Masser | B23K 20/08 | 267/187 |
| 4,171,830 | A * | 10/1979 | Metz | B62D 61/125 | 267/256 |
| 4,623,165 | A * | 11/1986 | Timmers | B62D 61/12 | 267/122 |
| 4,714,269 | A * | 12/1987 | Raidel | B60G 9/003 | 280/124.157 |
| 5,090,495 | A * | 2/1992 | Christenson | B60G 5/04 | 180/209 |

(Continued)

FOREIGN PATENT DOCUMENTS

| | | | | |
|---|---|---|---|---|
| DE | 2930155 | A1 * | 2/1981 | B60G 11/465 |
| DE | 3309729 | A1 * | 9/1984 | B60G 5/047 |

(Continued)

*Primary Examiner* — Nicole T Verley
(74) *Attorney, Agent, or Firm* — Amsted Industries Incorporated

(57) ABSTRACT

A lifting mechanism for a vehicle axle is provided wherein a vehicle includes a vehicle frame having a first rail component and a second rail component. A first mounting bracket is attached to the first rail component of the vehicle frame. A lifting component is attached to the first mounting bracket. A lateral load component has a first end attached to the lifting component and a second end attached to the second rail component of the vehicle frame. A bracket attaches the lateral load component to the vehicle axle such that upon extension of the lifting component, the vehicle axle is lifted.

10 Claims, 2 Drawing Sheets

(56) References Cited

U.S. PATENT DOCUMENTS 5,230,528 A * 7/1993 Van Raden ............ B62D 61/12 280/124.116
5,403,031 A * 4/1995 Gottschalk ............... B60G 9/02 280/124.157
5,573,266 A * 11/1996 Zalewski ............. B60G 17/017 280/6.151
5,588,665 A * 12/1996 Pierce ...................... B60G 9/02 180/209
5,620,194 A * 4/1997 Keeler ................... B60G 11/27 280/81.6
5,785,345 A * 7/1998 Barlas .................. B60G 11/465 280/124.116
5,791,681 A * 8/1998 VanDenberg .......... B60G 9/003 280/124.116
5,915,705 A * 6/1999 VanDenberg ............ B60G 9/00 280/43.17
6,003,885 A * 12/1999 Richardson ............ B62D 61/12 280/86.5
6,062,578 A * 5/2000 Richardson ............ B60G 11/28 280/81.6
6,398,236 B1 * 6/2002 Richardson ............ B60G 11/30 280/124.157
6,428,027 B1 * 8/2002 Stuart ...................... B60G 9/00 280/124.1
6,435,526 B1 * 8/2002 Karlsson ................ B62D 61/12 180/209
6,471,223 B1 * 10/2002 Richardson ............ B60G 7/001 280/124.116
6,752,406 B2 * 6/2004 Pierce .................... B60G 9/003 280/124.162
6,845,989 B2 * 1/2005 Fulton .................... B60G 11/27 180/24.02
6,880,839 B2 * 4/2005 Keeler ................... B62D 61/12 280/124.153
6,945,548 B2 * 9/2005 Dudding .................. B60G 7/04 267/122
7,131,652 B2 * 11/2006 Ramsey ................... B60G 9/00 280/86.5
7,243,747 B2 * 7/2007 Bender ................... B60S 9/215 180/15
7,293,781 B2 * 11/2007 Power .................... B60G 9/003 280/124.116
7,300,064 B2 * 11/2007 Johnson ................... B60G 9/00 280/124.106
7,331,588 B2 * 2/2008 Johnson ................... B60G 9/00 280/124.116
7,434,821 B2 * 10/2008 Hinz ...................... B60G 7/001 280/124.116
7,510,197 B2 * 3/2009 Gottschalk .............. B60B 35/06 280/86.5
7,648,149 B2 * 1/2010 Ryberg .................... B60G 9/00 280/124.106
7,690,663 B2 * 4/2010 Haire ....................... B60G 5/04 280/124.157
7,748,724 B2 * 7/2010 Gottschalk ............. B60G 9/003 280/86.5
8,186,658 B2 * 5/2012 Lewis, II ................. B60N 2/24 267/131
8,322,734 B2 * 12/2012 Yao ........................ B60G 9/003 280/124.116
8,403,346 B2 * 3/2013 Chalin ..................... B60G 9/00 280/43.18
8,459,666 B2 * 6/2013 Piehl ...................... B60G 9/003 280/124.116
8,480,103 B2 * 7/2013 Kiselis ................... B60G 7/001 280/124.11
8,641,062 B2 * 2/2014 Gottschalk ............... B60G 9/02 180/24.02
8,695,998 B1 * 4/2014 Karel ..................... B62D 61/12 280/86.5
8,851,492 B2 * 10/2014 Andreasen ............. B60G 9/003 280/124.116
8,910,960 B2 * 12/2014 Fowler ................... B60G 7/001 280/124.11
9,039,034 B2 * 5/2015 VanDenberg .......... B60G 11/18 280/124.169
9,096,261 B2 * 8/2015 Aldrich .................... B62D 7/20
9,352,628 B2 * 5/2016 Barton ..................... B60G 9/02
9,776,677 B2 * 10/2017 Yakimishyn ......... B62D 61/125
9,809,073 B2 * 11/2017 Lindsay ................. B60G 7/001
2006/0208464 A1 * 9/2006 Raidel, II ................. B60G 5/00 280/678
2007/0108711 A1 * 5/2007 Smith ...................... B60G 9/00 280/86.5
2008/0265530 A1 * 10/2008 Moliner Casani ....... B60G 5/04 280/5.507
2009/0001680 A1 * 1/2009 Buhl ...................... B60G 7/001 280/124.134
2014/0239607 A1 * 8/2014 Wu ........................ B60G 9/003 280/124.116

FOREIGN PATENT DOCUMENTS

DE 202011110639 U1 * 9/2015 .............. B23P 11/00
EP 3181384 A1 * 6/2017
FR 2657578 A1 * 8/1991 ............. B61D 3/184
WO WO-2006093458 A1 * 9/2006 ............. B60G 11/28
WO WO-2011084094 A1 * 7/2011 ............... B60G 5/00
WO WO-2012174708 A1 * 12/2012 ............. B60G 9/003
WO WO-2016041702 A1 * 3/2016 ............... B60G 7/02

* cited by examiner

AXEL LIFT MECHANISM

BACKGROUND OF THE INVENTION

The present invention relates to an axle lifting mechanism for use with heavy trucks and trailers. In particular, a mechanism that serves two purposes, including lifting the axle and providing structural support for lateral loading of the axle.

Such lifting mechanisms provide an efficiency advantage in situations where the truck or trailer is partially loaded or fully unloaded, and is intended to be used with a non-driven axle.

SUMMARY OF THE INVENTION

The axle lifting mechanism of the present invention is for use with heavy trucks and trailers, and relates to the ability to lift the axle of a truck or trailer in the partially loaded or unloaded state. Regulations around maximum weight limits per axle on trucks merit the need for additional axles when the truck is fully loaded (to the max weight rating of the truck). In situations where a truck has depleted its load, the drag associated with the additional tires on the ground is detrimental to fuel economy. In this situation, lifting the axle decreases the drag and prevents unnecessary wear on axle and tire components.

Typical air suspensions for heavy duty trucks are arranged as follows. Trailing arms oriented in the fore/aft direction mount to the axle, and connect to the frame of the truck through brackets and take the fore/aft loading applied by the axle. The trailing arms are allowed to pivot about the frame brackets, creating an arc that the axle can move in when the suspension system is compressed. Additionally, a laterally oriented arm is utilized to take side load of the system, which mounts to the axle and frame using bushings and brackets. The suspension system movement is controlled using shocks and air bags mounted between the frame and axle.

The present invention accomplishes the task of lifting the axle by replacing the lateral load carrying member of typical truck suspensions with a dual purpose piece that can continue to support the truck lateral load, but also can connect to an axle lifting component. The other end of the lifting component then mounts to the frame of the truck or trailer on a bracket. When extended, the lifting component applies a force to the lateral load carrying member, causing it to move upward and lift the axle in the process. The lifting component could be an air bag, hydraulic cylinder, or similar force-exerting component.

DETAILED DESCRIPTION

Figure 1:
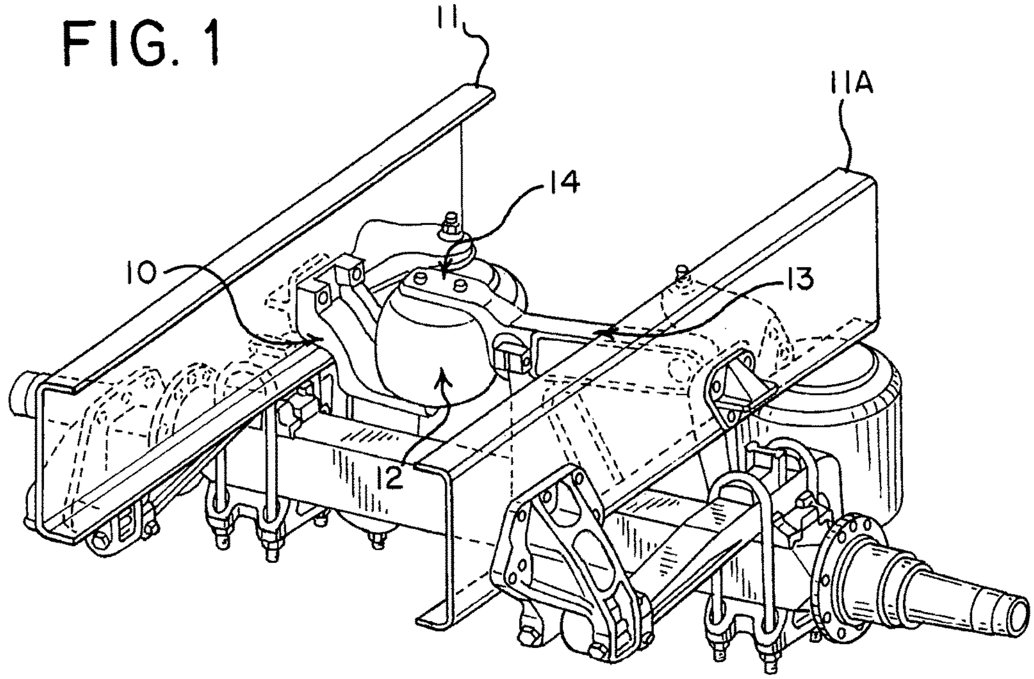
FIG. 1 is a perspective view of the lifting mechanism mounted on a typical tractor suspension system in accordance with a preferred embodiment of the present invention.

Referring now to FIG. 1, an axle lifting mechanism in accordance with an embodiment of the present invention is shown. The system is comprised of a lateral load carrying element 13, the lifting component 12, and the frame mounting bracket 10. Lifting component 12 is connected to one frame rail of the truck 11 using a bracket 10. The opposing side of the lifting component 12 is connected to the lateral load carrying element 13 on a mounting pad, an example of which is shown at 14.

Lifting component 12 is typically an air bag with sufficient size to lift the axle and prevent axle movement when lifted. When extended, lifting component 12 applies a force to the lateral load carrying element, moving the connected axle assembly upward along the normal axle travel path.

The lateral load carrying element 13 is comprised of a structural material, typically aluminum, steel or iron, and serves dual functions of:

1. Carrying the lateral load from the truck to the axle
2. Providing an application point for the lifting component 12 to apply a lifting force to the axle.

Figure 2:
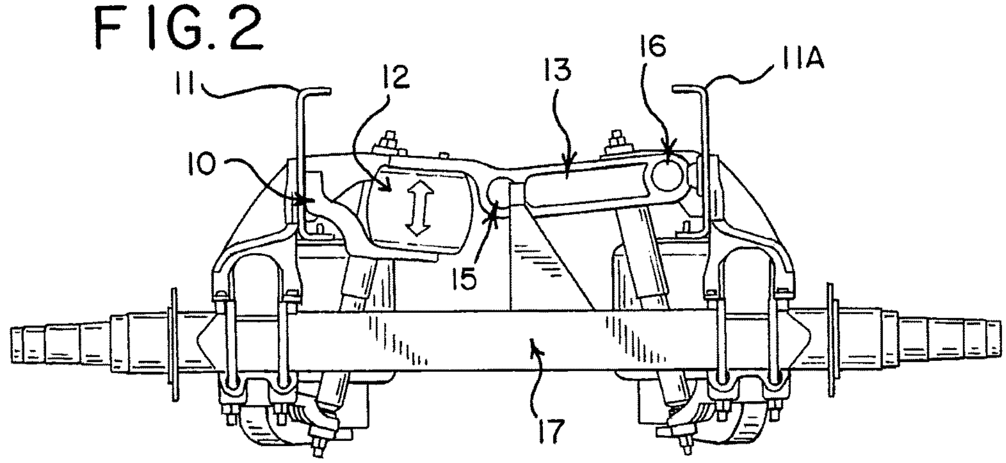
FIG. 2 is an end view of the lifting mechanism mounted on a typical tractor suspension system in accordance with a preferred embodiment of the present invention.

Referring now to FIG. 2, an axle lifting mechanism in accordance with an embodiment of the present invention is shown. The lifting component is shown at 12, which when extended applies lifting force to the lateral load carrying element 13. The lateral load carrying element 13 is mounted to the axle 17 using a bushing or similar compliant connection device 15. The opposing end of the lateral load carrying element 13 is additionally mounted to second truck frame rail 11A using a bushing or similar compliant connection device 16.

Figure 3:
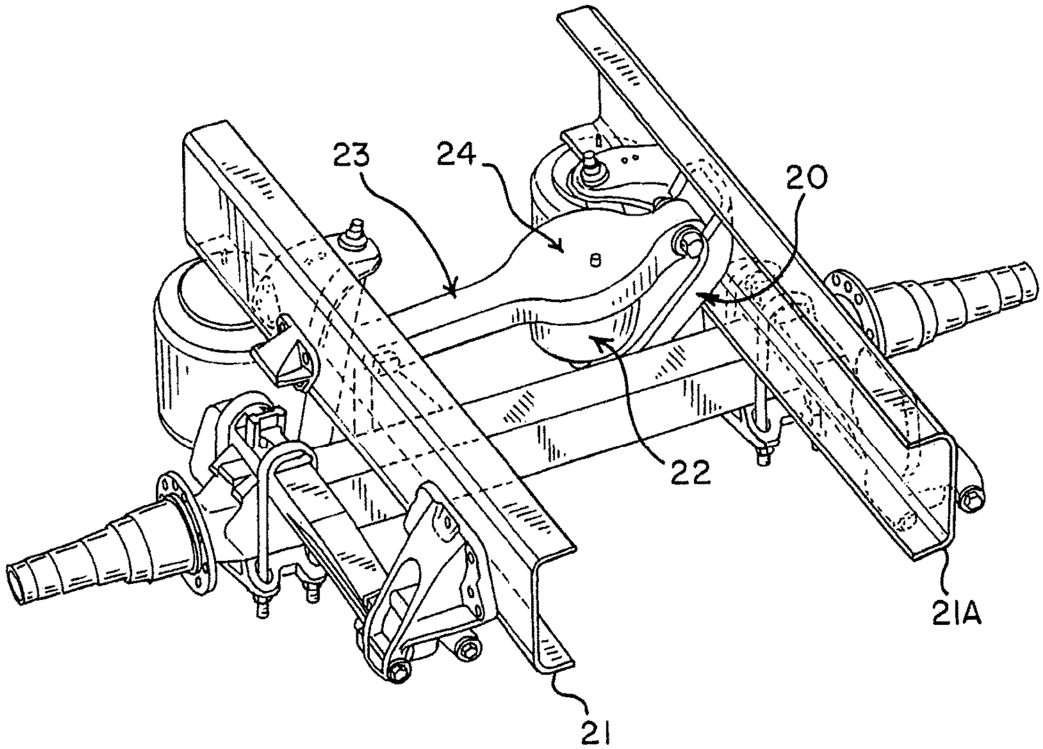
FIG. 3 is a perspective view of the lifting mechanism mounted on a typical tractor suspension system in accordance with an additional embodiment of the present invention.
Figure 4:
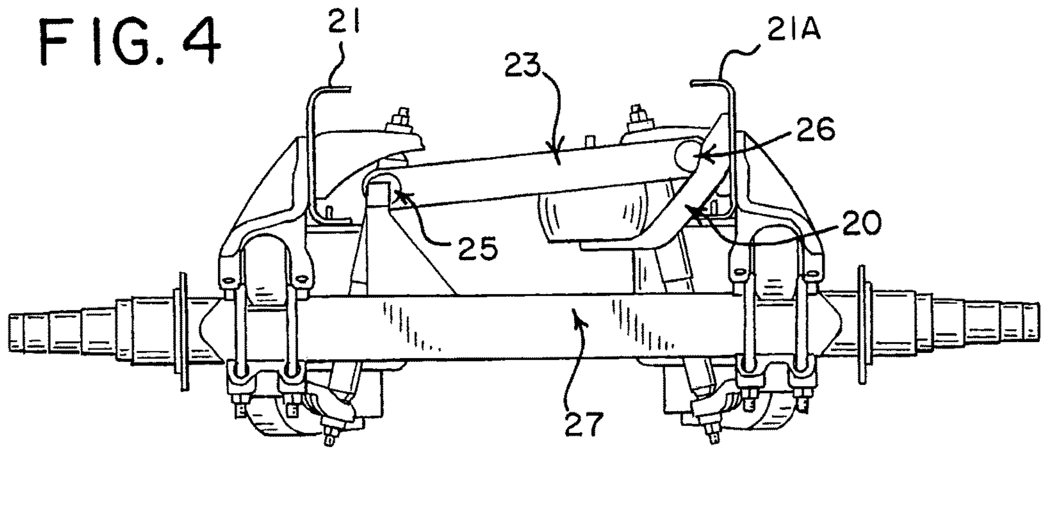
FIG. 4 is an end view of the lifting mechanism mounted on a typical tractor suspension system in accordance with an additional embodiment of the present invention.

Referring now to FIG. 3 and FIG. 4, an axle lifting mechanism in accordance with an embodiment of the present invention is shown. This embodiment differs from the embodiment shown in FIG. 1 and FIG. 2 by mounting the frame mounting bracket to the same frame rail as the lateral load carrying element is mounted to.

Referring now to FIG. 3, an axle lifting mechanism in accordance with an embodiment of the present invention is shown. The system is comprised of a lateral load carrying element 23, the lifting component 22, and a frame mounting bracket 20 mounted to truck frame rail 21A. Lifting component 22 is connected to frame rail 21A of the truck using bracket 20. The opposing side of the lifting component 22 is connected to the lateral load carrying element 23 on a mounting pad 24.

Lifting component 22 is typically an air bag with sufficient size to lift the axle and prevent axle movement when lifted. When extended, lifting component 22 applies a force to the lateral load carrying element, moving the connected axle assembly upward along the normal axle travel path.

The lateral load carrying element 23 is comprised of a structural material, typically aluminum, steel or iron, and serves dual functions of carrying the lateral load from the truck to the axle and providing an application point for the lifting component 22 to apply a lifting force to the axle.

Referring now to FIG. 4, an axle lifting mechanism in accordance with an embodiment of the present invention is shown. The lifting component 22, which when extended applies lifting force to the lateral load carrying element 23. The lateral load carrying element 23 is mounted to the axle 27 using a bushing or similar compliant connection device 25. The opposing end of the lateral load carrying element 23 is also mounted to truck frame rail 21A using a bushing or similar compliant connection device 26.

What is claimed is:

1. A lifting mechanism for a vehicle axle comprising a vehicle frame having a first rail component and a second rail component, a first mounting bracket attached to the first rail component of the vehicle frame, a lifting component having a bottom surface and a top surface, the bottom surface of the lifting component attached to the first mounting bracket, a lateral load component having a first end attached to the top surface of the lifting component and a second end attached to the second rail component of the vehicle frame, a bracket attaching the lateral load component to the vehicle axle such that upon extension of the lifting component, the vehicle axle is lifted.

2. The lifting mechanism of claim 1 wherein the lifting component comprises an air bag.

3. The lifting mechanism of claim 1 wherein the lifting component comprises a hydraulic cylinder.

4. The lifting mechanism of claim 1 wherein the second end of the lateral load component is attached to the second rail component of the vehicle frame with a bushing.

5. The lifting mechanism of claim 1 wherein the bracket attaching the lateral load component to the vehicle axle includes a bushing connected to the lateral load component.

6. A lifting mechanism for a vehicle axle comprising a first mounting bracket configured to attach to a first rail component of a vehicle frame, a lifting component having a bottom surface and a top surface, the bottom surface of the lifting component attached to the first mounting bracket, a lateral load component having a first end attached to the top surface of the lifting component and a second end attached to a second rail component of the vehicle frame, a bracket attaching the lateral load component to the vehicle axle such that upon extension of the lifting component, the vehicle axle is lifted.

7. The lifting mechanism of claim 6 wherein the lifting component comprises an air bag.

8. The lifting mechanism of claim 6 wherein the lifting component comprises a hydraulic cylinder.

9. The lifting mechanism of claim 6 wherein the second end of the lateral load component is attached to the second rail component of the vehicle frame with a bushing.

10. The lifting mechanism of claim 6 wherein the bracket attaching the lateral load component to the vehicle axle includes a bushing connected to the lateral load component.

* * * * *